United States Patent [19]

Morrison et al.

[11] 4,404,057
[45] Sep. 13, 1983

[54] REINFORCED PLASTIC SHEET MACHINE AND METHOD

[75] Inventors: Robert S. Morrison; Thomas A. DeLuca, both of Ashtabula; Ernest Pasqualone, Geneva, all of Ohio

[73] Assignee: Molded Fiber Glass Companies, Ashtabula, Ohio

[21] Appl. No.: 300,197

[22] Filed: Sep. 8, 1981

[51] Int. Cl.³ .............................................. B31F 7/00
[52] U.S. Cl. .............................. 156/324; 100/93 RP; 100/153; 156/443; 156/436; 156/549; 156/551; 156/553; 156/583.5; 425/373
[58] Field of Search ...................... 156/62.2, 62.6, 324, 156/443, 433, 436, 549–557, 583.5; 425/373; 100/151–154, 93 RP

[56] References Cited

U.S. PATENT DOCUMENTS

| | | | |
|---|---|---|---|
| 1,991,760 | 2/1935 | McEver et al. | 100/151 UX |
| 3,881,978 | 5/1975 | Livingston et al. | 156/324 X |
| 3,888,716 | 6/1975 | Morse | 156/295 X |
| 3,898,113 | 8/1975 | Meyer | 156/62.4 |
| 4,045,262 | 8/1977 | Enzinger et al. | 156/62.2 |
| 4,161,383 | 7/1979 | Gadani | 425/373 X |

Primary Examiner—David A. Simmons

Attorney, Agent, or Firm—Maky, Renner, Otto, & Boisselle

[57] ABSTRACT

Reinforced plastic (FRP) panels of substantial width are manufactured continuously in a machine utilizing two stainless steel belts, with an inner belt trained about a driven rotating heating drum and an idler sheave. An outer belt is trained about the inner belt as it passes around the drum and also about three idler sheaves, two being employed to direct the outer belt about the inner belt and the third being employed for tensioning and tracking purposes. An additional idler roll is employed as a nip roll where the two belts join substantially tangent to the heating drum. Both belts may have substantially horizontally flights for application of heat curable resin. A fiberglass or other reinforcement mat is fed into the nip. The resin such as unsaturated polyester may be fed in controlled doctored amounts of liquid form to provide a bead or puddle at the nip into and through which the mat is drawn. The heat of the drum initiates the cure to form a wide controlled thickness reinforced sheet. The speed of rotation of the drum and heat is controlled to obtain the desired product. Alternatively, thermoplastic sheets such as olefins may be fed to the nip on each side of the mat to form reinforced sheet. Again the feed rate is such so that a wetting bead of melt is obtained at the nip into which the fiberglass or reinforcing mat is drawn.

27 Claims, 10 Drawing Figures

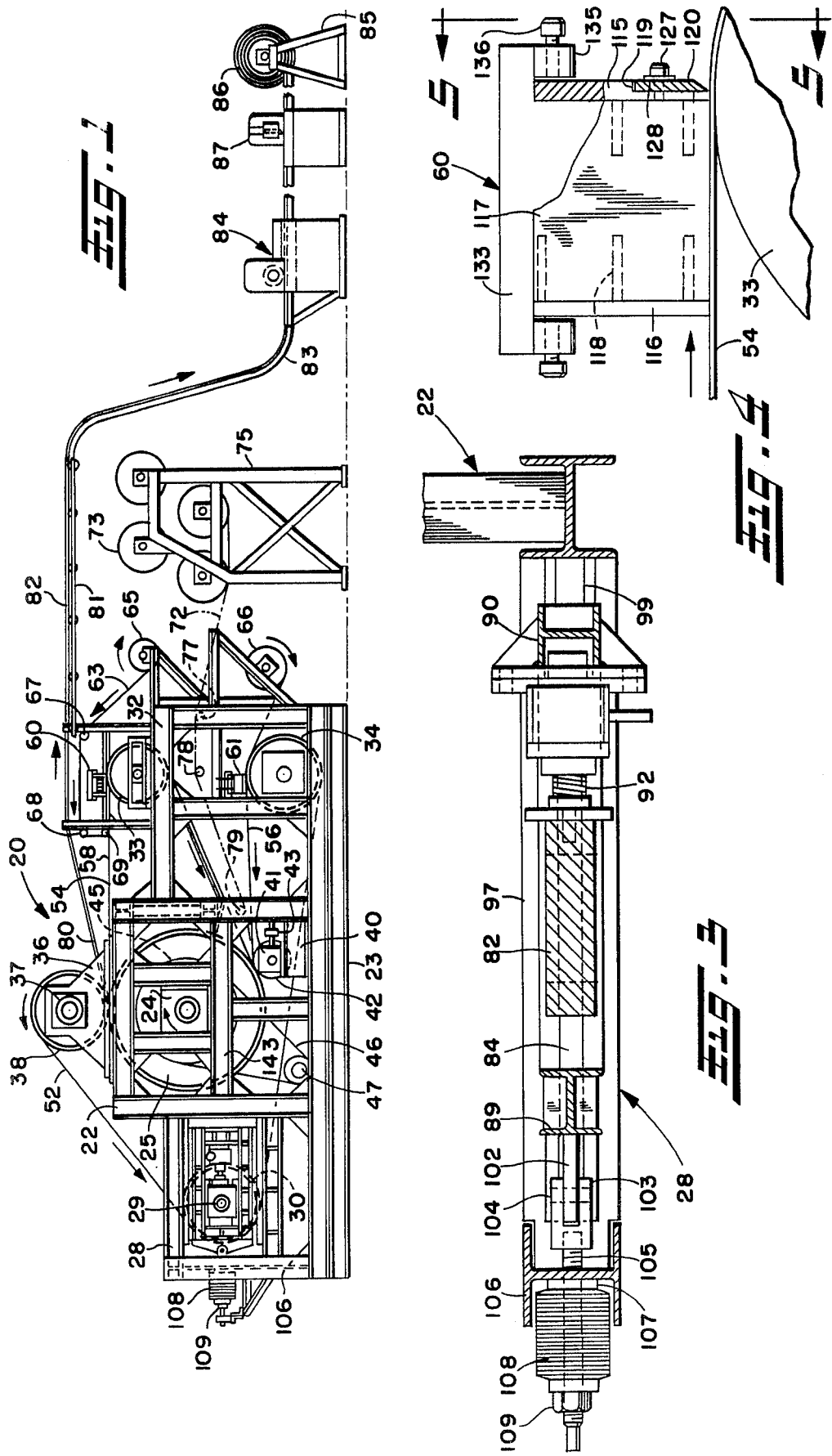

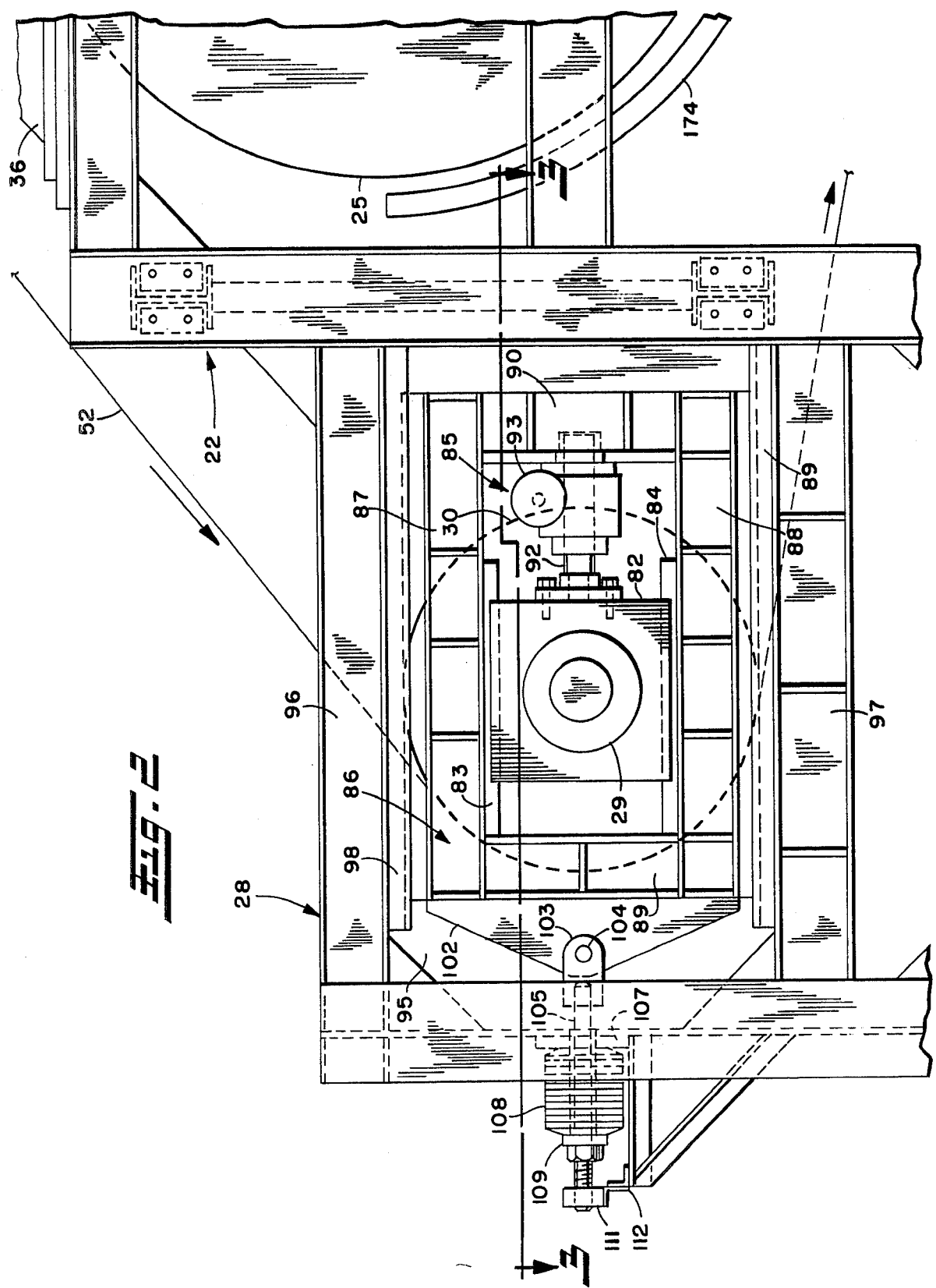

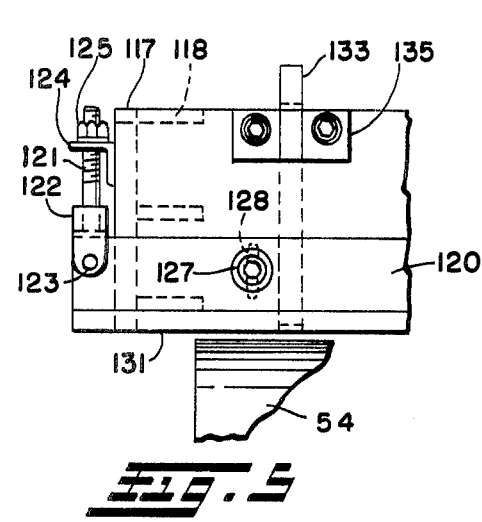
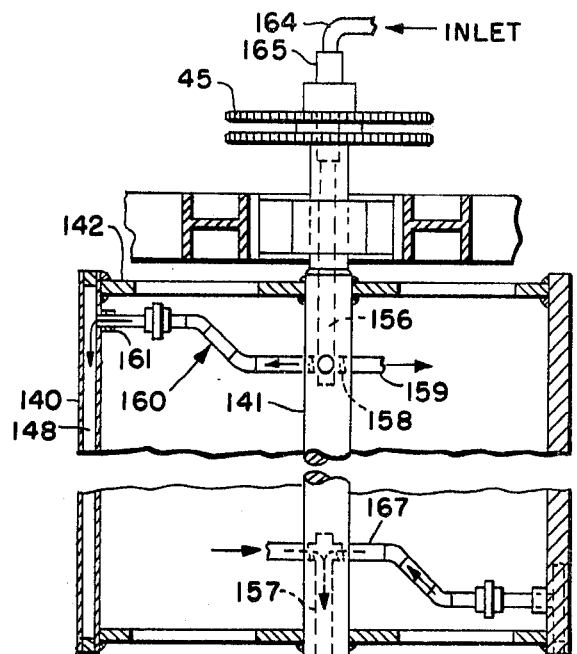
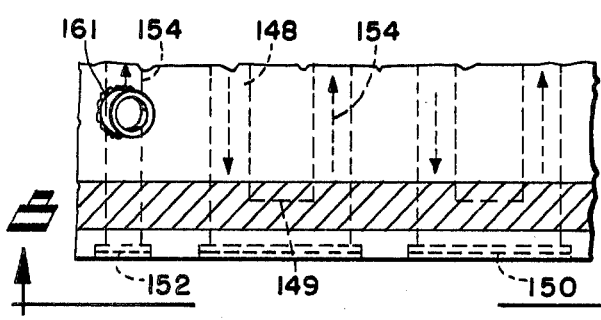
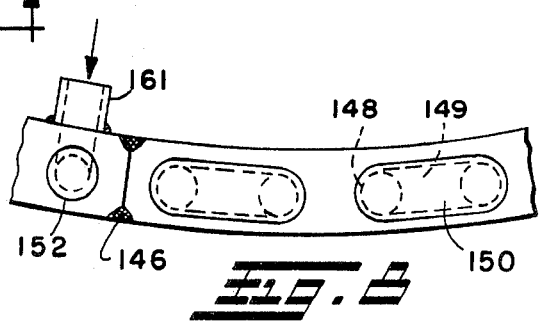
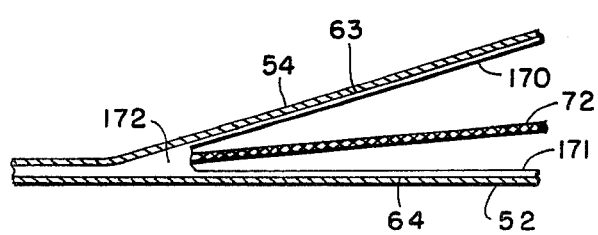
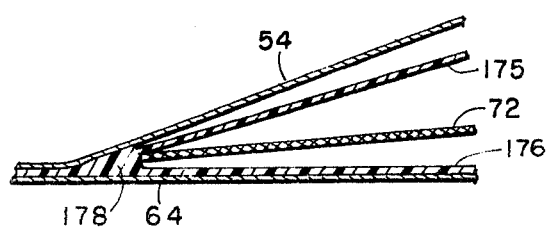

REINFORCED PLASTIC SHEET MACHINE AND METHOD

This invention relates as indicated to a reinforced plastic sheet machine and method and more particularly to a machine and method for continuously forming wide planar FRP (fiberglass reinforced plastic) sheets.

BACKGROUND OF THE INVENTION

If made continuously, extremely long and energy inefficient curing ovens are required for a relatively slow moving product. Also, it is difficult to obtain the desired surface finish or planarity, which often requires an embossed or textured surface for cosmetic appearance only.

As a result, large plastic reinforced panels such as employed as liners for refrigerator trucks or railroad cars are usually made by a matched metal die process. When closed and filled with a reinforced plastic composite or preform, the matched die mold is subject to heat and pressure to cure the plastic. The advantages of matched die molding are principally part-to-part uniformity and the ability to produce the desired finished surfaces on one or both sides of the panel. The disadvantages are primarily cost or productivity. Moreover, matched die molding is not energy efficient.

Matched die molding for large panels requires large presses which must be opened and closed. While open, they lose heat. Moreover, such process generally requires the use of wet molding composites or preforms which must be prepared to have the proper amount of reinforcement and resin. The composite or preform must then be inserted into the open press between the dies. The press then closes and remains closed under high pressure as the panel is first formed and then cured. The energy requirements and heat losses for large size presses forming such panels are substantial. Moreover, even if such presses are equipped with substantially automatic feed and part removal devices, a matched die process is labor intensive not only in the production of the molding composites or preforms but also in the loading and unloading of the press for subsequent panel trimming and storage. Moreover, the working environment in and around the heat of the press is less than ideal.

Accordingly, a machine or process which can continuously produce large size reinforced plastic (FRP) sheet or panels with energy efficiency is desirable.

A method of manufacturing plastic panels in a continuous process is shown in U.S. Pat. No. 3,163,698. In such process the reinforcement is applied between flexible sheets which is pulled around a pressure roll and through a heater sufficient to raise the temperature of the sandwich to approximately 200° C. for a period of time of about 2 minutes. Reinforced polyester sheets have also been made by direct application of chemically thickened polyester resin and chopped glass between films which pass through pressure rolls for subsequent curing as seen in U.S. Pat. No. 3,894,134.

Machines employing continuous belts which pass around a heated drum have long been employed for vulcanizing rubber and other sheet materials. Reference may be had to U.S. Pat. Nos. 3,726,627, 3,121,912, 2,434,541, 2,069,589, 2,958,096 and 1,806,811 for examples of such continuous belt vulcanizers.

Other types of machines using continuous bands or belts may be seen in Swallow U.S. Pat. No. 2,442,443 relating to the pressing of plastic sheet, Garrett U.S. Pat. No. 236,489 relating to the treating of fabrics with waterproofing materials, Kessler U.S. Pat. No. 3,241,182 relating to the production of embossed plastic mats, Einzinger U.S. Pat. No. 4,045,262 relating to the production of a laminar board with a base of bonded wood particles, and the early Weber U.S. Pat. No. 524,746 relating to the manufacture of cork board.

However, to applicant's knowledge, such machines have not been employed continuously to form reinforced plastic sheet for panels of substantial width while still obtaining dimensional accuracy, surface finish, and the proper distribution of the reinforcement and thermoplastic or thermoset materials into which the reinforcement must be evenly distributed.

SUMMARY OF THE INVENTION

With the present invention a dual belt or band machine is employed with such belts or bands moving around a substantial portion of the periphery of a heating drum. A single power drive is provided to the drum and from such drum both bands or belt are driven. With such single drive the duration of the panel being formed passing through the heating zone may be carefully controlled and such single drive also controls either directly or indirectly the amount of material being supplied between the belts to form the panel.

Alternatively, the inner belt may be omitted with the outer belt passing directly around the drum.

The outer belt passes around an adjustable roll which is adjustably spring loaded to obtain the belt-to-belt or belt-to-drum pressure. Both belts may also have at the front of the machine substantially horizontal flights to facilitate application of resin to the belts or to films running against the belts. Such films or foils may or may not be removed after the panel has cured and may be employed to provide a desired texture or surface finish to the product.

At the approximate point of tangency with the heating drum, a nip roll is provided over which the outer belt passes. By adjusting the nip roll or the pressure of the outer belt, the thickness of the materials entering the heating zone can carefully be controlled.

Whether the plastic material is thermoset or thermoplastic, it is preferred to obtain enough back pressure at the nip, belt-to-belt, or belt-to-drum, to form a slight bead or puddle which extends completely transversely along the nip into and through which the reinforcing material in continuous form is drawn. This insures a uniform transverse distribution and thickness. The operator may control the speed of the machine by observing the action of the materials at the nip. More sophisticated speed-puddle controls may be employed.

In this manner, the reinforcing material or mat is thoroughly wetted and entrapped air is expelled.

It is therefore a principle object of the present invention to provide a process for producing reinforced plastic sheet which comprises feeding a reinforcing material between the calibrated nip of opposed planar moving belts or bands or between a belt and drum as they move adjacent a heating zone, and feeding sufficient plastic or resin along one or both of the bands to cause the nip to form a bead or puddle along the complete transverse length of the nip thicker than the sheet through which the reinforcement passes into the heating zone.

Another important object is the provision of controlled resilient pressure for the outer band controlling the thickness of the sheet produced.

Another impotant object is the provision of such process where the resin may be applied in liquid form to both bands and in which the amount of resin applied can closely be controlle and once controlled is a function of the speed of the moving band.

Yet another object is the provision of such process which includes the step of passing removable or permanent films or foils between the bands and resin to provide a desired surface finish or texture.

Still another important object is the provision of a machine for the continuous manufacture of reinforced sheet and the like which includes a pair of inner and outer bands, or at least an outer band, passing at least partially around a power driven heating drum, the drive for the heating drum being the sole controlled drive of the machine.

Another object is the provision of such machine which includes a drum through which a heating medium is economically circulated to obtain an even distribution of heat.

Another object is the provision of such machine wherein one or both bands include at the feed or front end of the machine substantially horizontal flights on which materials may be applied.

Yet another object is the provision of such machine which includes a substantially horizontally adjustable nip roll at substantially the point of tangency of the outer hand with the drum.

Yet another object is the provision of such machine wherein the outer band includes an idler roll which is spring loaded and independently cantible.

Another important object is the provision of a machine and process which will economically produce reinforced plastic sheets or panels of substantial length and width, with a desired surface finish, such process and machine being energy efficient.

Other objects and advantages of the present invention will become apparent as the following description proceeds.

To the accomplishment of the foregoing and related ends the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a side elevation of a process line in accordance with the present invention utilizing the machine of the present invention;

FIG. 2 is an enlarged side elevation of the tracking and tension roll of the machine;

FIG. 3 is a horizontal section taken substantially on the line 3—3 of FIG. 2;

FIG. 4 is an enlarged side elevation of one of the meter boxes and the associated doctor blade which may be used with the present invention;

FIG. 5 is a fragmentary front elevation of the meter box as seen from the line 5—5 of FIG. 4.

FIG. 6 is a fragmentary section of the heating drum illustrating the circulation of heating medium therethrough;

FIG. 7 is an enlarged fragmentary radial section through an edge of the heating drum;

FIG. 8 is a fragmentary edge elevation of the heating drum as seen from the line 8—8 of FIG. 7;

FIG. 9 is a schematic illustration at the belt nip of the formation of sheet from thermoset materials such as polyester when the resin is applied in liquid form to the belt or belts; and FIG. 10 is a similar schematic illustration of the formation of a thermoplastic reinforced sheet.

DETAILED DESCRIPTION OF THE DRAWINGS

Referring first to FIG. 1 there is illustrated a machine shown generally at 20 for continuously forming reinforced plastic sheet. Such machine comprises a substantial frame 22 projecting upwardly from base 23 which supports the journal blocks 24 for heating drum 25. For purposes of orientation that portion of the machine on the right of the frame 22 as seen in FIG. 1 may be termed the front or feed portion of the machine while that portion on the left may be termed the back of the machine. On the back of the frame 22 there is provided two side frames 28 which floatingly support journals 29 for tensioning and canting roller 30. The details of the floating support are seen more clearly in FIGS. 2 and 3.

Toward the front of the machine there is supported on the base, an auxillary frame 32 which supports the journals for idler sheaves or rollers 33 and 34, the former substantially above the latter and substantially vertically spaced therefrom. The top of the roller 33 and the top of the roller 34 are vertically spaced a distance substantially equal to the diameter of the drum.

On top of the main frame 22 there is provided two upwardly extending triangular side plates 36 which support the journals 37 of idler roll 38. The axle of the idler roll 38 and the drum 25 are directly one above the other. In the lower right hand corner of the main frame 22, relatively short frames 40 horizontally adjustably support the journals 41 of nip roll 42. Horizontal adjustment of the nip roll may be obtained, if desired, by the screw jacks illustrated at 43.

The drum 25 is driven for rotation by sprockets 45 from chain drive 46 from jack shaft 47 which in turn is driven by a variable speed drive.

Trained around the various rolls and illustrated drum, are two stainless steel belts seen at 52 and 54. The belt 54 may be termed the idler belt or carrier belt and is simply trained around the drum 25 and the roll 33. Such belt may be approximately 0.040 inches thick by 112 inches wide and 40 feet in length. Under certain conditions, discussed below, it may be omitted.

The belt 52 may be termed an outer belt or tension belt and is also stainless steel. Such belt is approximately 0.060 inches thick by 112 inches wide and approximately 78 feet in length. The belt 52 is trained around the outside of idler roll 38 at the top of the machine, around the outside or back of the tension or control roll 30 at the back of the machine, around the outside of roll 34 at the front of the machine and over the top of the nip roll 42. From the nip roll 42 to the idler roll 38, the outer or tension belt passes around the exterior of the idler or carrier belt 54, or, of course, the drum 25.

It is noted that the nip roll 42 is positioned at the approximate point of tangency between the carrier belt 54 or the drum 25. This position of the nip roll and its horizontal adjustment avoids bending the inner or idler belt and also permits very fine adjustments to be made with little movement of the nip roll.

It is noted that belts 52 and 54 include substantially horizontal flights at the front or feed end of the machine. Such flights are shown for the respective belts at 56 and 58. The flight 56 for the outer or tension belt may be slightly downhill from the top of roller 34 to the nip.

It is noted that the machine frames are shown with the insulated housing or covers removed. Normally the machine will be completely insulated or enclosed except where raw materials enter at the front of the machine.

As seen in FIG. 1, the raw materials or components of the sheet or panel enter from the right or front of the machine and the finished product or panel also exits to the right or front of the machine over the top of the components.

The components passing between the belts, or the outer belt and drum, may be liquid resin such as polyester, which may be supplied from either or both of two transverse meter boxes seen at 60 and 61 associated with the belts 54 and 52, respectively. Such meter boxes are located substantially directly above the rolls 33 and 34.

Each belt is provided with a film covering as seen at 63 and 64 which passes beneath the meter box adjacent the belt. Such film is obtained from supply rolls 65 and 66 with the former supplying the film 63 over the top of the meter box 60 around the idler rolls 67, 68 and 69.

The mat of fibrous reinforcement such as fiberglass, graphite, or the like seen at 72 is supplied from rolls 73, four in number, on stand 75. Although not illustrated, the stand may be supported on wheels or rollers for shuttling moving normal to the plane of FIG. 1. Two such stands may be provided to facilitate loading of one while the other is being utilized. The fiberglass or like mat 72 is drawn over guide rolls 77 and 78 and beneath guide rolls 79 to enter the nip between the belts, or belt and drum, between the nip roll 42 and the drum 25.

As the components are drawn between the belts, or outer belt and drum, through the nip they are subjected to the pressure of the belts, or belt and drum one against the other and the heat from the drum 25. In the case of a thermoset material, the heat initiates the reaction to obtain a cured or curing product exiting over the top of the machine as seen at 80. The product as it exits the machine may still be exothermic and giving off heat from the reaction. The product passes over cantilever conveyor 81 as seen at 82 and down guide 83 to enter slitter and edge trimmer 84. The product may then pass to a coil stand 85 to be wound in coils 86. The product may also pass through a cut-off 87 used when the coil 86 is full. Alternatively, the cut-off may cut the panels or products into flat sheets for large palet storage and further transportation.

It is noted that the film on each side of the finished product, may remain with the panel in either coiled form or in flat form to be removed after shipment and prior to final use. The film may be used for two purposes. One is to impart a desired texture to the panel and the other is, of course, to protect and maintain and clean the stainless steel bands or belts 52 and 54, or the drum.

In addition, although not illustrated, paper ropes may be fed through the nip at each edge of the belts or belt and drum to provide a lateral dam for the resin in liquid form as it moves through the curing zone around the drum under high pressure. The paper ropes are compressible to form such dams and are disposed after use.

Tension and Track Roll 30

With reference to FIGS. 2 and 3 it will be seen that the journal 29 at each end of the shaft of the tension roll 30 is mounted in a journal block 82 which is supported on horizontally extending ways 83 and 84 on the interior top and bottom of window 84 formed by rectangular frame 86. The frame 86 comprises top and bottom horizontal frame members 87 and 88 and vertical frames 89 and 90 forming the window 85. Each block 82 is connected to the vertical frame member 90 by a screw jack 92 which may be driven from the right angle drive 93 through a suitable motor, not shown. Such screw jacks may control both the fore and aft position and the cant or angular position of the shaft of the roll 30 and may be driven from a belt edge tracking device reading the position of the edge of belt 52. By slightly changing the angle of the shaft of the roll 30, the tracking of the belt may thus be controlled.

The pressure of the belt 52 against the belt 54 or drum with the product components therebetween is also controlled by movement of the frame 86 within the window 95 of the larger rear frame 28. The frame 28 includes top and bottom horizontal frame members 96 and 97 on the bottom and top of which respectively, are supported ways 98 and 99. The top and bottom frame elements 87 and 88 may be gibbed to ride in such ways, respectively.

The vertical frame member 89 is provided with a triangular gusset 102 with clevis 103 being connected to the apex thereof by pin 104. The clevis is connected to threaded rod 105 which extends through the vertical frame member 106 of the frame 28, through bearing plate 107 and a series of large Belleville washers seen at 108. The Belleville washers are confined between the bearing plate 107 and nut 109. The pressure of the Belleville washers between the bearing plate and nut urges the screw shaft 105 and thus the frame 86, jacks, roll and belt to the left as seen in FIGS. 1, 2 and 3 tensioning the belt 52. The force exerted by the Belleville washers is controlled by adjusting the nut 109, and, of course, the jacks 92. The greater the Belleville washers are compressed, the greater force will be exerted on the tensioning roll. The outboard end of each screw shaft 105 is axially slidably mounted in collar 111 supported on brackets 112.

In any event, the mechanism illustrated and above described using the Belleville washer spring assembly, when assembled at approximately ½ the deflection of the Belleville washers will exert approximately 118,000 pounds of force. Such force can be adjusted by adjusting the nuts 109 and/or jacks 92. While the nip gages the initial thickness of the panel being formed, the Belleville washer and screw jack assemblies maintain that thickness throughout the curing zone adjacent the heating drum 25. The screw jacks 92 illustrated within the frame 86 may have a capacity of about 50 tons with adjustment and such jacks may be used for both tracking and tension adjustments.

The Belleville washer assembly also serves as a device to protect the belts and drum since it would normally be employed at about ½ its deflection. Thus, if foreign matter or hard lumps get into the machine, the washer assembly will still yield.

Meter Boxes

With reference to FIGS. 4 and 5, it will be seen that the meter boxes 60 and 61 may be in the form of elongated boxes extending completely transversely of the respective bands. Each box may be identical in form with the exception that the box 61 has the doctor blade on the opposite side from that seen with regard to the box 60 in FIGS. 4 and 5. Each box comprises a front wall 115 and a rear wall 116 which are closed at their ends by end walls 117. The box structure is rigidified by horizontally extending corner gussets seen at 118.

The front wall 115 is slightly thicker and is provided with a vertically extending doctor blade recessed on the lower front edge thereof as seen at 119 accomodating vertically adjustable doctor blade 120. The doctor blade is supported at each end by threaded hanger rod 121, the lower end of which is provided with a clevis pin connected to the blade at 123. The upper end of the hanger rod is threaded and extends through bracket 124. Nut 125 threaded on the rod controls the vertical position of the doctor blade at each end of the box. The doctor blade is further supported on the front wall of the box by fasteners 127 which are threaded into the front wall of the box and extend through vertically extending slots with a bottom knife edge 131 which is positioned a close and precise distance from the belt 54 and the film on the belt passing therebeneath. Projections or bosses are secured to the underside of the overhanging portion of the T-head as seen at 135, each accomodating two set screws 136 which may be employed to secure the dam in the desired laterally adjusted position. In this manner, the width of the application of the liquid resin may be controlled. The boxes may be kept filled by pumping the resin into the boxes and with such pumping the level in the box may be maintained during the operation of the machine and process.

Heating Drum

Referring now to FIGS. 6, 7 and 8 there is shown the construction of the drum and at least schematically the circulation path for a heat exchange medium therethrough.

As seen in FIG. 6 the drum includes a relatively thick circular shell or hub 140 which is mounted on hub shaft 141 by hub support plates 142. The shaft is journaled each end in the journal blocks 24 which are in turn supported on the horizontal frames 143 of the frame 22 (see FIG. 1). The drum is rotated by the drive sprockets 45 at one end. The hub or drum may be formed with a single relatively thick rolled plate formed into a cylindrical drum, the ends of which are welded together as seen at 146 in FIG. 8 to form the complete drum.

The relatively thick circular plate forming the drum is provided with equally spaced axially extending core drilled holes 148 extending entirely through the hub or drum from one end to the other. Alternating on each end of the drum there is formed connecting slots 149 connecting adjacent core drilled holes, which slots are then closed by plates 150 welded in place. Each quadrant of the drum will have at least one axial passage which is not connected on one end to an adjacent passage by a slot and such passage may be closed by a circular closure plate 152 welded thereover.

A heated medium such as hot oil or steam is circulated through each quadrant of the drum in the manner seen by the arrows 154 in FIG. 7 by providing each end of the shaft 141 with blind center bores as seen at 156 and 157 seen in FIG. 6. Near the blind end of each bore, there is provided four quadrant spaced radially drilled and tapped holes 158 receiving radially extending pipes 159. Each pipe is connected through generally radially extending piping 160 to a projecting coupling 161 on the interior of each of the quadrants of the drum.

As seen in FIG. 6, the inlet side may be at one end of the drum while the outlet side is at the opposite end of the drum similarly connected to the blind bore 157. The heated medium may be provided from a fluid heater from the source 164 through a swivel joint 165 to enter the blind hole 156. From the hole the hot liquid radiates to the four quadrants of the drum through the piping 160 and is then circulated through the quadrants in the complex serpentine fashion shown by the arrows 154 in FIG. 7. The hot medium then returns to the bore 157 through the quadrant spaced piping 167 to return to the heater. Accordingly, each quadrant of the drum is provided with one inlet at one end of the drum and one outlet at the opposite end of the drum. The temperature of the drum can be maintained at the desired temperature level as the components of the product move through the heating zone from the nip until the cured or curing product exits at the top of the drum.

Product and Process Examples

Referring first to FIG. 9, there is an enlarged schematic illustration at the nip between the two belts and it will be seen that the carrier belt 54 has a film layer 63 thereagainst and polyester or other resin coating on the underside of the film as seen at 170. The mat or mats 72 are drawn from the roll stand 75. Also, the belt 52 is provided with a film 64 thereadjacent and also a layer of liquid polyester as seen at 171. The liquid layers 170 and 171 are, of course, provided by the meter boxes 60 and 61, respectively.

It is noted that the belt 52 may extend slightly downhill to the nip and the layers of liquid resin 170 and 171 form a pool or liquid bead seen at 172 which extends completely transversely at the nip. In this manner, the liquid resin puddles at the nip and spreads out uniformly transversely of the belt. In this manner a glob is built up all the way across and this eliminates air bubbles or voids in the product and serves properly to wet the mat. The machine pulls the mat through the puddle and the mat also pulls the resin from the puddle at the nip roll.

The finished product may be approximately 4 to 16 ounces per square foot and may be up to $\frac{1}{8}$ of an inch thick. As an example, two fiberglass mats 1.5 and 2 ounces per square foot may be pulled into compression around the drum with film top and bottom. The top film may be planar or without embossments and serves to provide a finished surface and to protect the belt 54. The lower film may be embossed or textured to provide the desired surface finish. The lower film may be approximately 0.000142 inches in thickness while the top film may be approximately 0.0009 inches in thickness. With the above mats, the finished panel of approximately 4×8 feet may weigh about 24 pounds. Depending on its thickness and, of course, the mats employed, a finished panel of 4×8 feet high may weigh from about 8 to about 32 pounds. Approximately 75% of the panel by weight may be the polyester or other resin and the balance may be the fiberglass or other reinforcement. In any event, the resin will range from about 50 to 90% by weight while the fiberglass will range from about 10 to 50% by weight.

As specific examples of the preferred embodiments of the process, an FRP sheet of approximately 0.090 inches in thickness may be produced utilizing a 1.5 and a 2 ounce mat and polyester resin while running the machine at about 10 feet per minute. With the curing zone at about 290° F., the product remains in the curing zone for about 1.47 minutes and begins to exotherm after movement through the curing zone of about 120°. After leaving the curing zone the product is about 90% cured. The tension on the belt 52 produces approximately 20 p.s.i. on the product in the curing zone and such pressure may vary by approximately plus or minus 5 p.s.i. The product produced as described above may be made with good surface finish and planarity without belt 54 and with neither film embossed.

Another similar product utilizing both belts may be produced with one of the films embossed to provide the desired surface finish. It will be appreciated that the speed of the machine is a function of the temperature employed for a given thermosetting resin since the cure zone is of fixed length.

For the higher speed and thus more economical process, the temperature may be varied from about 275° to about 300° F.

It will also be appreciated that veils may be employed in addition to the fiberglass mat 72 on one or both sides if special surface finishes are desired.

With reference now to FIG. 10, it will be seen that the same machine may be employed to produce fiber reinforced thermoplastic sheet by feeding two sheets 175 and 176 of thermoplastic material on opposite sides of the reinforcing mat 72. Normally, with thermoplastic sheet, the films need not be employed unless it is desired to apply a texture to one or both surfaces. Again, the fiberglass may be approximately 10 to 50% by weight of the total thermoplastic panel produced and the sheet of the thermoplastic material 175 and 176 may be slightly less than half the thickness of the finished product. As in the case with the thermosetting resin, the two belts at the nip will form a bead of heat softened thermoplastic material seen at 178 through which the fiberglass mat 72 is drawn. To facilitate the formation of the bead 148, auxillary heating may be applied to the nip roll 42 if desired. The materials employed are thermoplastics and preferably of the olefin group and preferably polypropylene, although other olefins may be employed.

It can now be seen that there is provided a machine and a process for producing reinforced plastic sheet of substantial size and width on a continuous basis with energy efficiency which obviates the problems inherent with the matched metal die process.

We claim:

1. A process of continuously forming FRP sheet comprising the steps of depositing a liquid thermosetting resin on a film which is supported on a belt, thereafter depositing glass fiber components on the liquid thermosetting resin, impregnating the glass fiber components with the resin by drawing the glass fiber components and liquid thermosetting resin through a nip defined by a nip roll over which the belt is trained and a heating-curing drum against the periphery of which the belt presses the glass fiber components and resin, and establishing and maintaining a substantially uniform sheet thickness during impregnation of the glass fiber components with the resin and curing of the latter by adjusting the position of the nip roll relative to the drum and by adjusting the tension in the belt.

2. A process as set forth in claim 1 wherein a film is positioned on both sides of the components as they pass through the curing zone.

3. A process as set forth in claim 2 wherein one of the films is embossed to impart its surface to the finished sheet.

4. A process as set forth in claim 2 wherein the components are elevated to a temperature of from about 240° to about 300° F. to cure the resin.

5. A process as set forth in claim 1 wherein the components in the curing zone are subjected to a surface pressure of from about 15 to about 25 p.s.i. to form the sheet as the resin is cured.

6. A process as set forth in claim 1 wherein such drum is driven at a speed sufficient to draw the belt, components and film through the curing zone to initiate the cure reaction of the resin which is then completed beyond the curing zone.

7. A process as set forth in claim 1 wherein the drum is driven to drive the belt to move the components through the curing zone at a speed of up to 18 feet per minute.

8. A process as set forth in claim 1 wherein the drum is of a size to form a curing zone of about 12 feet in length.

9. A machine for the manufacture of fiberglass reinforced plastic sheet comprising a circular heated drum, a nip roll, belt means passing between said nip roll and said drum and trained about said drum for drawing the components of the sheet through a nip defined by said nip roll and said drum and through a heating zone under pressure between said belt means and said drum, and adjustment means for controlling the thickness of the finished fiberglass reinforced sheet, said adjustment means consisting essentially of means for adjusting the size of the nip defined by said nip roll and said drum and means for adjusting the tension in said belt.

10. A machine as set forth in claim 9 wherein said tension adjusting means includes an idler roll for said belt, movable journals for said idler roll, and respective frames for said journals.

11. A machine as set forth in claim 10 wherein said jack means interconnect said journals and their respective frames.

12. A machine as set forth in claim 10 wherein said frames are movable in a direction to affect tension of said belt.

13. A machine as set forth in claim 12 wherein said spring means urges said frames in a direction to increase the tension of said belt.

14. A machine as set forth in claim 13 including fixed frames for said movable frames, said spring means reacting between said fixed and movable frames.

15. A machine for the manufacture of fiber reinforced plastic sheet comprising a circular heated drum and a belt trained about said drum to draw the components of the sheet through a heating zone under pressure between the belt and drum, said drum comprising a shell, means to circulate a heating medium through said shell as it rotates, said shell including a plurality of sections, each section including an inlet and outlet connected directly to a heater, said shell being mounted on a shaft, and blind bores in each end of said shaft forming an inlet and outlet for the heating medium, each section including radially extending couplings to the respective blind bores.

16. A machine as set forth in claim 15 wherein said shell sections include a plurality of axial bores with adjacent bores being connected alternately at opposite ends to form a serpentine passage through each section.

17. A machine as set forth in claim 16 including passages in each end of said shell to form such adjacent bore connections, and cover plates covering such passages.

18. A machine as set forth in claim 15 wherein the surface of the drum is embossed.

19. A machine as set forth in claim 15 wherein said drum is driven for rotation at an adjustable speed.

20. A machine as set forth in claim 15 wherein such heating medium is heated oil or glycerol.

21. A machine for the manufacture of fiberglass reinforced plastic sheet and the like comprising a circular drum, a belt trained about a portion of said drum, means to drive said drum and thus to drive said belt, an idler roll for said belt, movable journals for said idler roll, respective frames for said journals and tension means for said belt to control the pressure of said belt against said drum, said tension means comprising spring means, and jack means operative to vary the force exerted by said spring means, said frames for said journals being movable in a direction to effect tension of said belt, fixed frames for said movable frames, said spring means reacting between said fixed and movable frames and urging said frames in a direction to increase the tension of said belt, said spring means comprising a series of opposed Belleville washers.

22. A machine as set forth in claim 21 including means to adjust the deflection of said spring means apart from said jack means.

23. A machine for the manufacture of fiber reinforced plastic sheet and the like comprising a circular drum, a belt trained about a portion of said drum, means to drive said drum thus to drive said belt, and tension means for said belt to control the pressure of said belt against said drum, said tension means comprising spring means and jack means operative to vary the force exerted by said spring means, said spring means and said jack means operating in opposition to each other.

24. A machine as set forth in claim 23 wherein said spring means comprises a series of opposed Belleville washers.

25. A machine as set forth in claim 24 including means to adjust the deflection of said washers apart from said jack means.

26. A machine as set forth in claim 22 including means to adjust the deflection of said spring means whereby said belts operate at about one-half the deflection of said spring means.

27. A continuous FRP sheet machine comprising a heated drum, a belt trained about a portion of said drum operative to press the components of such sheet thereagainst, such components comprising liquid thermosetting resin and glass fiber reinforcement, means for moving said belt, drum and components around said drum at a speed so that the dwell time of the resin against said drum is sufficient to commence cure of the resin to exotherm thus to complete cure of the resin after it leaves the belt drum interface, and tension means for said belt to control the pressure of the belt against the drum including spring means and jack means operative to vary the force exerted by said spring means, said spring means comprising a series of opposed Belleville washers.

* * * * *